Patented Nov. 1, 1927.

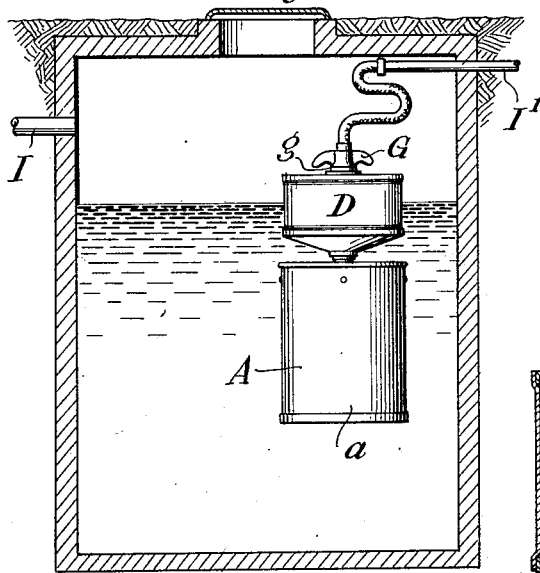
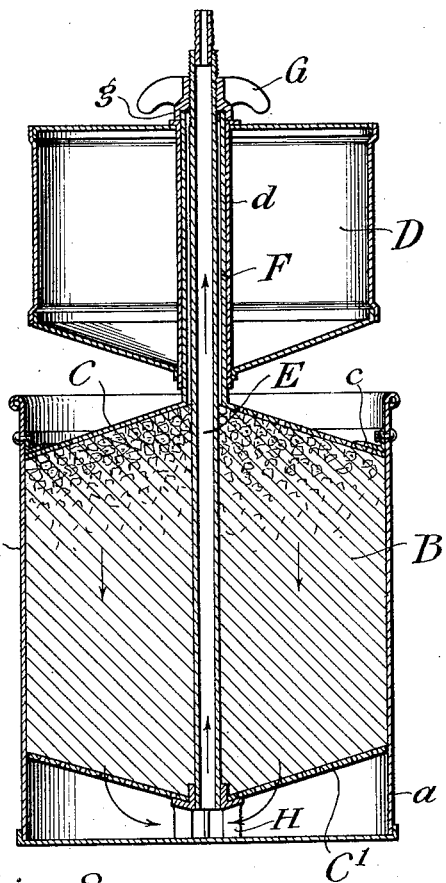
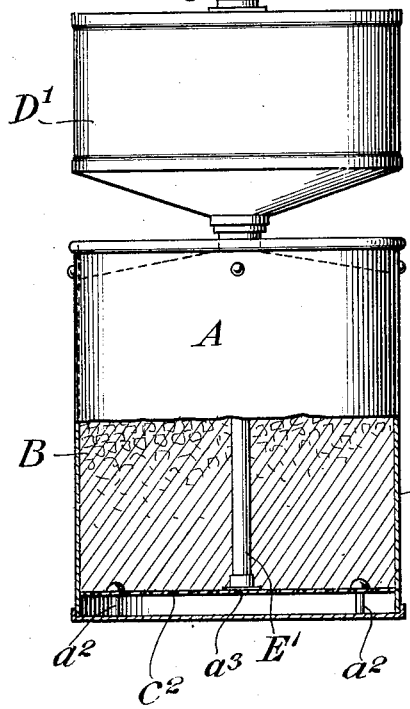
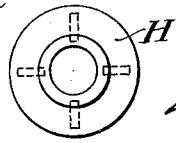

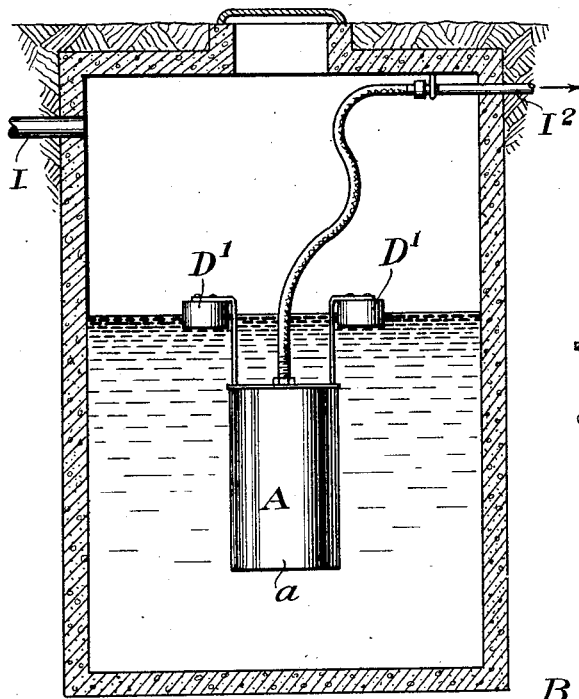
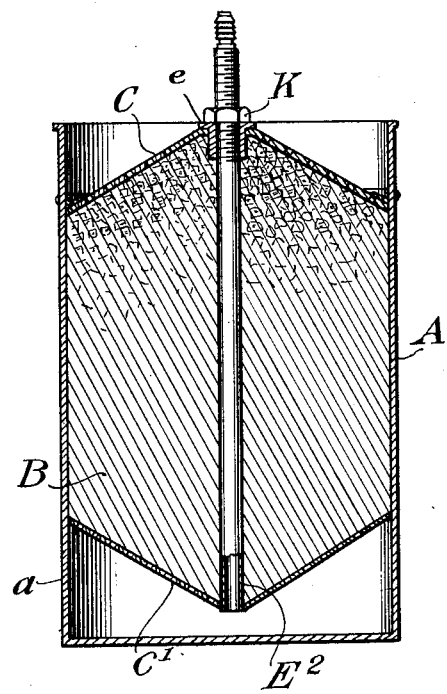
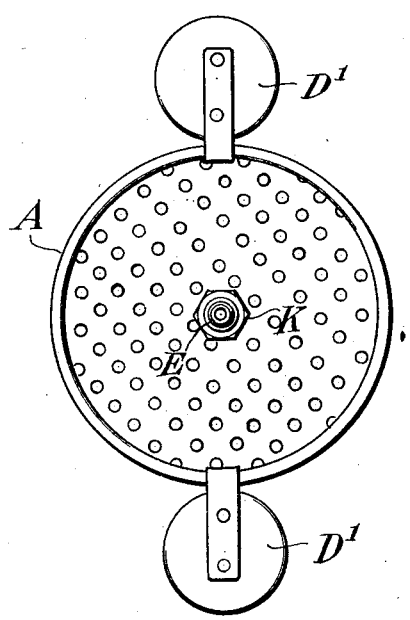

1,647,809

UNITED STATES PATENT OFFICE.

AUGUST NEUMANN, OF REPPEN, GERMANY, ASSIGNOR TO JOHN ASTROM, OF FORT WAYNE, INDIANA.

FLOATING FILTER.

Application filed July 23, 1925. Serial No. 45,543.

This invention relates to filters, and more particularly to filters adapted for use in connection with cisterns or tanks for filtering rain water for domestic use.

The main object of the invention is to provide a simple and efficient device for filtering rain water that may be conducted from the roof of a dwelling house into a cistern or tank and filtered to remove impurities therefrom so that the filtered water may be used as drinking water or for washing and bathing purposes.

A further object is to provide a device of the character referred to unadapted to float on the surface of the water, yet having only a slight tendency to sink, thus adapting it to be easily submerged and held suspended in a body of water within a tank or cistern and having attached thereto a superposed float for holding it suspended below the surface of the liquid, together with means for conducting the liquid to be filtered downwardly through the filtering material into a hollow space or chamber adapted to receive the filtered water, and means for conducting the filtered water into a service pipe, or a pipe connected with a suction pipe through which the clean water may be drawn into the house by means of a hand pump.

The invention will first be hereinafter more particularly described, with reference to the accompanying drawings, which are to be taken as a part of this specification, and then pointed out in the claims at the end of the description.

In said drawings, Fig. 1 is a vertical sectional view of a cistern or water tank, showing in side elevation a floating filtering device embodying my invention; said device being submerged and suspended in water by means of a superposed float and connected with a service pipe for drawing off the filtered water for domestic use;

Fig. 2 is a vertical sectional elevation of the filtering device proper detached;

Fig. 3 is a detail view of a device for supporting the filtering material and associated parts above the bottom of a receptacle containing such material so as to provide a clear water space between such material and the closed bottom of the container in communication with a pipe for conducting the filtered water from said space;

Fig. 4 is a side elevation, partly in section, of a modified form of filtering device, similar to the structure shown in Fig. 2;

Fig. 5 is a vertical sectional view of a cistern showing in side elevation another modification of the filtering device shown in Fig. 1;

Fig. 6 is a vertical sectional view of the filter proper shown in Fig. 5; the floats being removed; and Fig. 7 is a plan view of the last mentioned filtering device.

Referring to said drawings, in which the same reference letters are used to denote corresponding parts in different views, the letter A denotes the filtering device proper consisting of a receptacle $a$, preferably cylindrical in form, having a closed bottom and an open top and containing a body of filtering material B consisting of granulated cork compressed between perforated partitions or partition plates C and $C^1$, which are spaced apart sufficiently to receive the filtering media therebetween. The weight of the compressed cork, plus the weight of the receptacle and associated parts is such that the device is adapted to be submerged in and remain suspended below the surface of the water in the cistern or tank with a tendency to sink slowly to the bottom of the receptacle, and to adapt the device to float or remain suspended within the liquid a slight distance below the surface thereof. Said receptacle has secured thereto a float D, which, as shown, consists of a hollow cylindrical body or vessel concentric with the vessel or receptacle A of the filtering device and having a closed top and bottom and a centrally disposed pipe or tube $d$ protruding through said top and bottom and soldered or otherwise secured thereto so as to provide watertight connections therewith. The top plate or cover and bottom of the float may fit within annular recesses in the upper and lower ends of a cylindrical body member, as shown, and be soldered or otherwise secured thereto so as to provide water-tight connections between said parts and adapt the device to float in water and serve as a means for suspending and holding the subjacent filtering device suspended below the surface of the liquid. The bottom of the float D is preferably dish-shaped, as shown, and the annular air space therein around the tube $d$ adapts it to float upon the surface of the water and prevent the attached filter from sinking. The perforated partition plates or diaphragms C and C¹ are preferably dish-shaped or of substantially concavo-convex form with the concave surface of the lower plate facing the concave surface of the upper plate and the two plates are connected by means of a hollow rod or pipe E, the lower end of which is secured to the lower perforated plate C¹ and it extends therefrom upwardly through an opening in the upper perforated plate C and through a tube or sleeve F which has its lower end secured within the opening in said upper perforated plate and extends upwardly therefrom through the centrally disposed tube $d$ in the superposed float D. The hollow rod or pipe E has its upper free end threaded and has a wing nut G screwed thereon, said wing nut being formed with a depending annular base flange $g$ within which there is a shoulder that rests upon the upper end of said sleeve F, while said annular flange overlaps the upper end of said sleeve and rests upon the top of the float D or the flanged upper end of the tube $d$ which surrounds said sleeve. One of the plates C or C¹ is vertically movable within the casing or receptacle $a$, while the other plate is held stationary and by means of the wing nut G on the threaded end of the hollow rod or pipe E, the movable perforated plate will be drawn toward the other perforated plate, thereby compressing the granular cork between the two plates so as to form a cork body which is not adapted to float on the surface of the liquid, but has a tendency to sink slowly to the bottom by reason of the weight of the compressed cork body and its container and associated devices for compressing the cork. The latter is compressed by the contraction of the two screen members C and C¹ by means of the pressure screw or pipe E, so that through the compressed mass of cork, water for example may be filtered clear (in passage) from top to bottom. The cork filtering mass is previously especially prepared and purified as well as deacidified by long boiling in the water bath. By the action of the cork the entire filter is kept floating and the float D holds it suspended a few inches beneath the surface of the water, so that pre-clarified water constantly flows to the filter from the clearing zone, whereby the same may remain in use for many months before a cleaning or renewal of the filter mass is necessary. Either the upper or the lower perforated plate C or C¹ may be fixed and the other movable for the purpose of compressing the cork. Fig. 2 of the drawings illustrates an arrangement in which upward movement of the upper plate is limited by brackets or abutments $c$ fixed on the inner side of the receptacle $a$ and the lower plate may be moved toward the upper plate or vice versa, by means of the described adjusting device.

The lower perforated plate is spaced from the closed bottom of the receptacle so as to provide a suitable space or chamber for clean or purified water, and this chamber is in communication at its lower end with the lower end of the pipe E through spaced members of a spider-like device H having a central tubular flange or boss in which the lower end of said pipe E is secured; said device also having depending legs which rest on the bottom of the receptacle $a$ so as to support the lower perforated plate above said bottom when in its lowermost position. The tank or cistern has connected thereto the inlet end of a pipe I for introducing liquid to be filtered, and the outlet end of a service or suction pipe I¹ for drawing off the filtered liquid; the pipe I¹ being connected with the upper end of the pipe E, which leads from the filtered water chamber by means of a flexible tube so as to permit the filtering device to move freely upon the surface of the liquid and to rise and fall as the supply of liquid is increased or diminished.

In operation, the rain water or liquid to be filtered enters the cistern through the pipe I and passes downwardly through the filtering media into the filtered water chamber and from thence it is caused to pass upwardly through the hollow pipe into a suction pipe connected therewith and from thence is drawn into the clean water pipe or pipes of the house or other building in which the filtered water is to be used.

In Fig. 4 of the drawings I have shown a modification which is substantially identical with the construction shown in Fig. 2, except that instead of the lower perforated plate of the form shown in Fig. 2, supported upon the spider-like device at the lower end of the outlet pipe, a flat plate C² is fixedly secured to the closed bottom of the receptacle $a^1$, by means of bolts or rivets $a^2$, in order to reduce the height of the filter. The upper plate, indicated in dotted lines, is movable, and the outlet pipe E¹ has its lower end secured to the center of the plate C² over an opening $a^3$ therein and extends up through the upper perforated plate and central tube of the concentric float D¹ in the manner described with reference to Fig. 2.

In Figs. 5 to 7 I have shown another modification in which the concentric float above the filter is omitted, and instead thereof the receptacle $a$ has attached thereto a float or floats D¹, which are adapted to hold the receptacle suspended at a certain distance below the surface of the water to be filtered, as described with reference to the construction shown in Figs. 1 and 2 of the drawings, and a body of granular cork is compressed between upper and lower perforated plates of substantially the same form as those shown in Fig. 2, said plates being movably fitted within the receptacle while the upper screw threaded end of the pipe E² is connected by a flexible pipe or hose with the service or suction pipe I². In the latter modification the lower perforated plate is secured to the lower end of an outlet pipe E² having a sleeve or collar e thereon fitting a central opening in the upper perforated plate, and a nut K is screwed on the threaded end of the pipe E² so that the granular cork may be compressed between the two plates by turning said nut.

It will be understood of course that various changes may be made in the details and arrangement of parts without departing from the spirit and scope of my invention, and I therefore do not desire to be limited in the appended claims to the specific construction and arrangement shown.

Having thus described my invention, what I claim as new and desire to secure by Letters Patent of the United States is:

1. A floating filtering device adapted to be freely suspended in water within a cistern; said device comprising a receptacle having a clear water space at its bottom and containing a body of light granular filtering material compressed so that the receptacle will not float on the surface of the water but has a tendency to sink, thus adapting it to be easily suspended below the surface of the liquid, means within said receptacle for compressing said material to the desired extent, and a superposed float rigidly secured to said receptacle for holding it and its contents suspended in water.

2. A floating filtering device adapted to be freely suspended in water within a cistern; said device comprising a receptacle having a chamber for filtered water at its bottom and containing a body of filtering material composed of granulated cork compressed so that the receptacle will not float on the surface of the water but has a tendency to sink, thus adapting it to be easily suspended below the surface of the liquid, means within said receptacle for compressing the cork to the desired extent, and a superposed float rigidly secured to said receptacle for holding it and its contents suspended in water, together with means for conducting the liquid to be filtered in a downward direction through the cork body into said chamber, and then upwardly into a service pipe.

3. In combination with a cistern or tank having a water supply pipe and a discharge pipe connected therewith in the upper part thereof, a submergible filter comprising a receptacle having a chamber for filtered water in its bottom and containing a body of light granular filtering material compressed so that the receptacle will not float on the surface of the water but has a slight tendency to sink, thus adapting it to be easily suspended below the surface of the water, and a superposed float rigidly secured to said receptacle for holding it freely suspended below the surface of the water in said cistern and having a flexible pipe connection with said discharge pipe for conducting filtered liquid from said filtered water chamber.

4. In combination with a cistern or tank having a water supply pipe and a discharge pipe connected therewith in the upper part thereof, a submergible filter comprising a receptacle having a filtered water chamber in its bottom and containing a body of light granular compressed cork unadapted to float on the surface of the liquid and a superposed float attached to said receptacle concentric therewith for holding it freely suspended below the surface of the water in said cistern and having a flexible pipe connection with said discharge pipe for conducting filtered liquid therefrom; and means within said receptacle for compressing the cork to the desired extent and conducting the liquid in the cistern downwardly through the cork body into said filtered water chamber, together with means for conducting the filtered liquid upwardly into said discharge pipe.

5. A filtering device adapted to be freely suspended in water within a cistern; said device comprising a receptacle containing upper and lower perforated partition plates, one of which is movable toward the other; a filtered water space being provided within said receptacle between its bottom and the lowermost perforated plate, a body of granulated cork between said plates compressed to such extent that the receptacle is unadapted to float on the surface of the water and has a slight tendency to sink slowly to the bottom of the cistern, thus adapting it to be easily suspended below the surface of the water, adjustable means connecting said perforated plates for compressing the cork body therebetween, said means including a hollow rod or pipe adjustably connecting said plates, and a float mounted on said hollow rod and secured to said receptacle concentric therewith for holding it suspended in the water within the cistern.

6. A floating filtering device comprising a receptacle having a water space at its bottom and an open top and containing a body of filtering material composed of granulated cork compressed so that the receptacle is unadapted to float on the surface of the water and has a tendency to sink, means within said receptacle for compressing the cork and conducting the liquid to be filtered downwardly therethrough, said means including a hollow rod adjustably connecting perforated plates between which the filtering material is compressed, and also connecting said water space with a discharge or service pipe extending outwardly through the cistern, and a superposed float secured on said hollow rod concentric with said receptacle whereby the filtering body is held freely suspended in a body of water.

7. A floating filtering device for cisterns comprising a receptacle having an open top and containing a body of filtering material composed of granulated cork compressed so that the receptacle is unadapted to float on the surface of the water and has a tendency to sink slowly to the bottom, means within said receptacle for compressing the cork and conducting the liquid to be filtered downwardly therethrough and upwardly therefrom, said means including a hollow rod adjustably connecting upper and lower perforated plates for compressing the filtering material therebetween, and a superposed float secured on said hollow rod concentric with said receptacle, whereby the filtering body is held freely suspended in a body of water, together with means for conducting the filtered liquid into a service pipe.

8. A floating filtering device comprising a receptacle having an imperforate bottom and an open top and containing a body of granular filtering material of low specific gravity compressed between upper and lower perforated plates, so that the receptacle is unadapted to float on the surface of the water and has a tendency to sink slowly to the bottom, a water chamber being formed between said bottom and said lower plate, a float attached to said receptacle, a hollow rod connecting said plates and also connecting said water chamber with a flexible tube; the latter being connected to a service pipe, said hollow rod having means thereon for moving one of said perforated plates toward the other for compressing said filtering material therebetween.

9. In combination with a cistern or tank, a floating filter comprising a receptacle having a filtered water chamber at its bottom and containing a body of compressed granular cork, means within said receptacle including perforated plates spaced apart and adjustably connected for confining and compressing the cork therebetween so that it is unadapted to cause the receptacle to float on the surface of the liquid but has only a slight tendency to sink; said perforated plates serving as means for conducting the liquid in the cistern downwardly through the cork body into said filtered water chamber, a float attached to said receptacle for holding its suspended below the surface of the water, and a hollow rod or pipe serving as the means for adjustably connecting said perforated plates; said pipe extending through said cork body and through said float and having means thereon for moving one of said plates toward the other and also serving as a means for conducting the filtered water upwardly into a service pipe.

10. In combination with a cistern, a filtering device comprising a receptacle having an imperforate bottom and containing upper and lower perforated partition plates, a body of compressed granulated cork compressed between said plates so that the receptacle is unadapted to float on the surface of the water and has a tendency to slowly sink; a filtered water space being provided within said receptacle between its bottom and the lowermost perforated plate, adjustable means including a pipe connecting said perforated plates for compressing the cork therebetween, said pipe connecting said water space with a flexible tube for connection with a service pipe, and a float mounted on said pipe for holding said receptacle suspended below the surface of the water within the cistern.

11. In combination with a cistern, a floating filter comprising a body of granular filtering material lighter than water enclosed in a receptacle and compressed between upper and lower perforated plates so that the receptacle has a tendency to sink slowly in water and is adapted to be easily held suspended therein and easily raised; said receptacle having a clean water space therein at its bottom and means adjustably connecting said perforated plates and co-operating therewith for compressing said material and conducting liquid therethrough into said space and outwardly therefrom, and a float rigidly attached to said receptacle concentric therewith and slightly separated therefrom whereby it is held freely suspended in water.

12. A filter for cisterns comprising a receptacle having an open top and a clear water space in its bottom and containing a body of light granular filtering material compressed so that the receptacle is unadapted to float on the surface of water and has a tendency to sink slowly to the bottom, thus adapting it to be easily submerged and remain suspended below the surface of the water, upper and lower perforated plates between which said filtering material is compressed and through which the water flows downwardly into said water space, one of said plates being movable toward the other, a floating device secured to said receptacle for holding it suspended below the surface of the water, and a pipe connecting said perforated plates and extending upwardly from said clear water space through said filtering material and having a nut screwed thereon and means associated therewith whereby the movable plate may be drawn toward the other plate for compressing said material; the free end of said pipe being adapted for connection with a flexible tube adapted for connection with a suction or service pipe leading from the cistern.

13. A filter comprising a receptacle having an open top and having fitted therein upper and lower perforated plates and a filtering medium of low specific gravity compressed between said plates, so that the receptacle is unadapted to float on the surface of water and has a tendency to sink slowly to the bottom, thus adapting it to be easily submerged and remain suspended below the surface of the water, means for moving one plate toward the other for compressing said filtering medium; said lower plate being raised slightly above the bottom of the receptacle to provide a clear water space, a pipe extending from said water space through said filtering medium and through said perforated plates and having its outer end adapted for connection with a flexible tube adapted for connection with a suction or service pipe through which the filtered liquid may be drawn from the cistern, and a float secured to said receptacle for holding it suspended in water.

In testimony whereof I affix my signature.

AUGUST NEUMANN.